United States Patent [19]

Gunnoe, Jr.

[11] Patent Number: 4,659,954
[45] Date of Patent: Apr. 21, 1987

[54] CARBON BRUSHES IN SEALED SILICONE ENVIRONMENT WITH CONTROLLED VAPOR PRESSURE

[75] Inventor: George H. Gunnoe, Jr., E. Stroudsburg, Pa.

[73] Assignee: General Electric Company, Schenectady, N.Y.

[21] Appl. No.: 806,065

[22] Filed: Dec. 6, 1985

[51] Int. Cl.$^4$ .............................................. H02K 9/20
[52] U.S. Cl. .................................. 310/248; 252/49.6; 310/228
[58] Field of Search ............. 310/52, 88, 89, 239–248, 310/228, 251, 252, 253, 227; 252/15, 49.6

[56] References Cited

U.S. PATENT DOCUMENTS

| | | | |
|---|---|---|---|
| 2,703,372 | 3/1955 | Savage | 310/228 |
| 3,283,040 | 11/1966 | Stover | 264/29 |
| 3,772,080 | 11/1973 | McKee | 117/228 |
| 4,241,271 | 12/1980 | Johnson et al. | 310/248 |

Primary Examiner—Patrick R. Salce
Assistant Examiner—D. L. Rebsch
Attorney, Agent, or Firm—Jerome C. Squillaro

[57] ABSTRACT

A sealed enclosure surrounding the brushes and metallic contact members of a dynamoelectric machine is maintained at a positive pressure with an inert gas. A predetermined vapor pressure of a silicone lubricant is maintained in the sealed enclosure. The silicone lubricant mixes with a carbon film on the surface of the metallic contact members to produce a highly lubricating, low-resistance layer which improves the wear resistance and predictability of wear of the carbon brushes.

7 Claims, 1 Drawing Figure

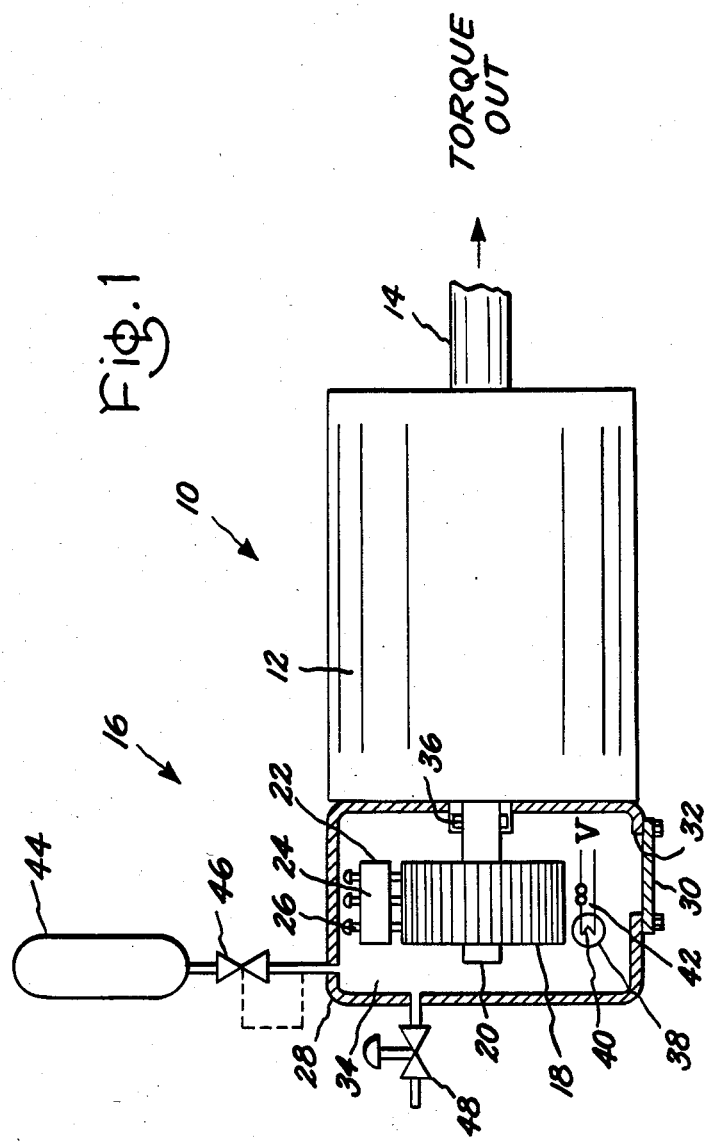

CARBON BRUSHES IN SEALED SILICONE ENVIRONMENT WITH CONTROLLED VAPOR PRESSURE

BACKGROUND OF THE INVENTION

The present invention relates to dynamoelectric machines and, more particularly, to dynamoelectric machines of the type employing carbon brushes making sliding contact with a metallic contact member.

Many types of dynamoelectric machines employ carbon brushes contacting a segmented metallic commutator for transferring electric power between a stationary and a rotating member. The best-known of such dynamoelectric machines include DC motors and generators, and AC induction motors of the type having wired rotors. In all of these devices, rotor windings are individually connected to metallic contact members, such as commutator bars or collector rings, arranged to form a cylindrical surface with which the bearing surfaces of stationary carbon brushes make sliding contact.

One skilled in the art will recognize that the metallic contact members may also be annular slip rings contacted by stationary brushes. For compactness of description, the following disclosure is directed toward segmented commutators. It should be understood that the invention applies equally to apparatus having slip rings.

Although carbon brushes contacting metallic commutator bars or collector rings have been known since the very early days of rotating electrical machinery, the exact manner in which the electricity is transferred is not completely understood.

In a conventional commutator-brush system, the brushes are intended to wear at a controlled rate which is slow enough to avoid excessive machine down-time for their replacement. The metallic commutator is intended to be relatively durable preferably with a lifetime measured in years. It has been found that several conditions can arise which drastically increase the wear rate of the brushes and the commutator.

In a properly operating commutator-brush system, a lubricating conductive oxide film is formed on the surface of the commutator running in the presence of atmospheric moisture and oxygen. The conductive oxide film maintains the contact resistance between the brush face and the commutator base metal at a satisfactorily low value. The lubricating qualities of the conductive oxide film reduce brush and commutator wear. The brushes and commutator are maintained in contact with the atmosphere in order to provide access to oxygen and moisture.

It is believed that moisture lubricates relative slippage of the interfaces between the carbon planes thereby to permit slippage for conforming the carbon to the metal interface, and thus to reduce abrasion. In the complete absence of moisture, the carbon from which carbon brushes are made is so abrasive that the lifetimes of brushes and commutators are very short.

If the amount of moisture is insufficient, abrasion increases substantially. Even when sufficient moisture is present, high brush temperatures can prevent penetration of the moisture into the carbon brushes. For example, it has been observed that brush temperatures exceeding about 100 degrees C. lead to rapid wear.

Wear is accelerated when a large number of brushes are connected in parallel for carrying a high current. If the contact resistance of one brush rises higher than that of its neighbors, current is selectively carried by the brushes having lower contact resistance. This process leads to rapid brush wear which may proceed in an avalanche fashion with rapid brush destruction.

Excessive oxidation of the brushes is a principal cause of rapid brush wear. The presence of atmospheric contaminants, acidic or alkaline materials, oil vapors and materials capable of catalyzing the oxide film or the brush carbon, may produce such excessive oxidation and lead to excessive brush and/or commutator wear.

Some such atmospheric contaminants, such as solid particles, may be filtered out of the air entering the region containing the brushes and commutator. Filtering is less successful against chemical vapors which are especially capable of promoting excessive oxidation. However, even when filtering is successful, the necessity to supply air and moisture to the conventional commutating process essentially precludes sealing the brush-commutator system in a sealed enclosure.

As noted, one important attribute of the brush-commutator interface is lubrication. While a certain amount of lubricant such as, for example, drying oils, is conventionally formed within carbon brushes, it is insufficient to provide all of the necessary lubrication.

In order to seal against all external contaminants without requiring moisture control, some means must be found to provide the required additional lubrication. External oils and greases are not favored on the commutator surface since, to be effective, these require a lubricating film which is so thick that it produces a high contact resistance with all of the consequences of selectivity and catastrophic rapid brush wear noted above. Other types of lubricants such as, for example, molybdenum disulfide, although satisfactory in carefully controlled vacuum applications, can be broken down by an electrical arc into abrasive compounds such as, for example, molybdenum tri-oxide.

No satisfactory lubricating technique has heretofore been disclosed which permits satisfactory operation of a carbon-brush/contact-member system while avoiding the above causes of excessive brush and/or commutator wear.

OBJECTS AND SUMMARY OF THE INVENTION

Accordingly, it is an object of the invention to provide a system for improving the operating lifetime of a carbon brush.

It is a further object of the invention to improve the predictability of a carbon brush lifetime.

It is a further object of the invention to provide apparatus permitting sealing the environment of a brush and commutator system.

It is a still further object of the invention to provide apparatus for providing a predetermined film thickness of a silicone lubricant between brushes and commutator in a sealed chamber containing an inert gas.

Briefly stated, the present invention provides a sealed enclosure surrounding the brushes and metallic contact members of a dynamoelectric machine which is maintained at a positive pressure with an inert gas. A predetermined vapor pressure of a silicone lubricant is maintained in the sealed enclosure. The silicone lubricant mixes with a carbon film on the surface of the metallic contact members to produce a highly lubricating, low-resistance layer which improves the wear resistance and predictability of wear of the carbon brushes.

BRIEF DESCRIPTION OF THE DRAWING

FIG. 1 is simplified schematic view, partly in cross section, of a DC motor including a sealed brush-commutator system according to an embodiment of the invention.

DETAILED DESCRIPTION OF THE PREFERRED EMBODIMENT

One promising lubricating material for lubricating the brush-commutator interface is one of the many types of commercially available silicone lubricant compounds. Some silicone compounds are capable of providing sufficient lubrication using films which are thin enough to provide low contact resistance. However, silicone tends to decompose in the presence of oxygen to produce compounds which function as catalysts capable of extremely rapid oxidation of the carbon brushes. In addition, if moisture is present when a silicone lubricant is used, the hydrogen and oxygen in the moisture are electrolytically separated by the electric current at the interface to provide enough oxygen to catalyze the carbon brushes.

As a consequence of the foregoing, I have discovered that silicone lubricants are unsatisfactory for long-term brush lubrication in open systems to which atmospheric oxygen and moisture are admitted. Furthermore, without oxygen and moisture, a conventional oxide film cannot be formed. Thus, a new system for providing lubrication with satisfactory contact resistance is required.

Referring to FIG. 1, there is shown, generally at 10, a DC electric motor according to an embodiment of the invention. DC electric motor 10 includes a motor housing 12 which may contain conventional stator, rotor and bearing elements (none of which constitute an inventive part of the present disclosure and are thus omitted from the figure). An output shaft 14 extends from a first end of motor housing 12 to apply output torque to a load (not shown).

A brush and commutator system 16 at a second end of motor housing 12 includes a cylindrical commutator 18 driven by a commutator shaft 20 extending motor housing 12. Commutator 18 is conventionally surrounded by a brush assembly 22, only a portion of which is shown in order to reveal elements which would otherwise be hidden. Brush assembly 22 includes a brush holder 24 including conventional means (not shown) for resiliently urging a plurality of carbon brushes 26 into mechanical and electrical contact with the surface of commutator 18. Conventional means (not shown) apply electrical power to carbon brushes 26 in the appropriate polarity to create a torque in motor housing 12.

A sealable housing 28 surrounding commutator 18 and brush assembly 22 is sealedly affixed to motor housing 12. In the preferred embodiment, sealable housing 28 is welded in a gas-tight seal to motor housing 12. A hatch 30 sealingly covers an access opening 32 in sealable housing 28 to form a sealed space 34 therewithin whose atmosphere is controlled in the manner to be described. Access opening 32 is provided for inspection and replacement of carbon brushes 26, as well as for replenishing consumable materials in the lubricating system.

Motor housing 12 may be of a type having pressurized gas or air coolant therein. If the gas is one which interferes with satisfactory operation of brush and commutator system 16, a conventional gas-tight shaft seal 36 is included at the interface between motor housing 12 and commutator shaft 20.

A silicone reservoir 38 contains a supply of a silicone lubricant, preferably a liquid silicone lubricant. A heater coil 40 maintains the temperature of the silicone lubricant in silicone reservoir 38 at a substantially constant predetermined temperature under control of a thermostatic switch 42. A pressurized gas supply 44 is connected through a constant-pressure valve 46 to the interior of sealed space 34. A purge valve 48 permits purging air and moisture from sealed space 34.

The gas in pressurized gas supply 44 is preferably an inert gas which is incapable of reacting either with the carbon in carbon brushes 26, or the metal in commutator 18. The gas may be, for example, a noble gas such as neon, argon or xenon, but is most preferably a commercial dry nitrogen gas because of the almost universal availability and low cost of such material. When hatch 30 is first sealed, purge valve 48 is opened while gas is admitted into sealed space 34 from pressurized gas supply 44 by constant-pressure valve 46. The pressure threshold of constant-pressure valve 46 is set to provide a positive pressure against atmospheric so that any gas interchange between the atmosphere and sealed space 34 constitutes a gas outflow, rather than a gas inflow. When the air and moisture has been thus driven out of sealed space 34, purge valve 48 is sealed and the entry of further air and moisture therein is positively blocked.

The temperature setting of thermostatic switch 42 is selected to produce a predetermined vapor pressure of silicone lubricant in sealed space 34. Preferably, a silicone lubricant is selected having a boiling point higher than the highest temperature expected within sealed space 34. The temperature setting of thermostatic switch 42 is then set a sufficient amount in excess of the boiling point to assure that the desired silicone vapor pressure is maintained. This prevents the silicone vapor pressure from responding to the temperature within sealed space 34, rather than being constant as desired. In the preferred embodiment of the invention, the maximum temperature expected in sealed space 34 was well below 100 degrees C. A liquid silicone lubricant having a boiling point of 100 degrees C. was employed. The temperature in silicone reservoir 38 was controlled to about 110 degrees C. to produce the desired vapor pressure.

It would be clear to one skilled in the art that the numeric values in the above example are for convenience only, and may be adjusted by one skilled in the art to fit the requirements of a particular DC electric motor 10 and an available type of silicone lubricant. For example, silicone lubricants are also available with boiling points both above and below 100 degrees C. One such lubricant could be substituted for the example lubricant with suitable adjustment of the temperature setting of thermostatic switch 42.

I have discovered that the theory of lubrication and contact resistance in the present invention requires revision of the conventional theory. Since oxygen is excluded, no lubricating conductive oxide layer can form on the surface of commutator 18. In addition, the absence of moisture prevents the normal lubrication of the carbon in carbon brushes 26.

As commutator 18 rotates in contact with carbon brushes 26, carbon is wiped onto commutator 18 in a manner similar to chalk depositing on a slate. The silicone vapor mixes with the carbon particles wiped onto commutator 18 to produce a highly lubricating film of high conductivity. The high conductivity results, at least in part, from the extreme thinness of the carbon-silicone layer. The absence of oxygen prevents the silicone from breaking down into materials capable of catalyzing the carbon which, in turn, may destroy the carbon brushes. In addition, the exclusion of all other atmospheric contaminants by the sealed, inert, positive-pressure atmosphere in sealed space 34 prevents carbon or metal abrasion or breakdown from these causes.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A carbon brush and metallic contact member system for a dynamoelectric machine, comprising:
   at least one metallic contact member rotatable by said dynamoelectric machine;
   at least one carbon brush in sliding contact with said at least one metallic contact member;
   a sealable housing containing said at least one metallic contact member and said at least one carbon brush;
   means for providing a positive pressure of a dry inert gas in said sealable housing;
   means for maintaining a predetermined vapor pressure of a silicon lubricant in said sealable housing including;
   (a) means for containing a supply of said silicone lubricant in said sealable housing;
   (b) said silicone lubricant being of a type whose vapor pressure is related to its temperature; and,
   (c) thermostatically controlled means for mantaining said supply of said silicone lubricant at an operating temperature which provides said predetermined vapor pressure.

2. A carbon brush and metallic contact member system according to claim 1 wherein said metallic contact member includes a commutator.

3. A carbon brush and metallic contact member system according to claim 1 wherein said means for providing a positive pressure includes a pressurized gas supply of said dry inert gas and a constant-pressure valve effective to maintain said positive pressure of said dry inert gas within said sealable housing.

4. A carbon brush and metallic contact member system according to claim 3 wherein said means for providing a positive pressure includes a purge valve for purging air and moisture from said sealable housing.

5. A carbon brush and metallic contact member system according to claim 1 wherein said silicone lubricant is a liquid having a boiling temperature and said operating temperature is a predetermined amount above said boiling temperature.

6. A carbon brush and metallic contact member system according to claim 1 said means for containing said supply of said silicone lubricant includes a silicone reservoir in said sealable housing.

7. A carbon brush and metallic contact member system according to claim 6 wherein said thermostatically controlled means includes a heater coil in thermal contact with said silicone lubricant and a thermostatic switch effective to control a flow of electricity to said silicone reservoir at an average value which maintains said supply of said silicone lubricant in said silicone reservoir at said operating temperature.

* * * * *